E. GARNIER.
DEVICE FOR SECURING HORSES OR MULES WHILE BEING SHOD.
APPLICATION FILED MAR. 23, 1918.

1,318,202.

Patented Oct. 7, 1919.
3 SHEETS—SHEET 1.

Inventor:
Eugène Garnier
By [signature]
    Attorney.

E. GARNIER.
DEVICE FOR SECURING HORSES OR MULES WHILE BEING SHOD.
APPLICATION FILED MAR. 23, 1918.

1,318,202.

Patented Oct. 7, 1919.
3 SHEETS—SHEET 2.

Inventor:
Eugène Garnier
By [signature]
Attorney.

E. GARNIER.
DEVICE FOR SECURING HORSES OR MULES WHILE BEING SHOD.
APPLICATION FILED MAR. 23, 1918.
1,318,202.
Patented Oct. 7, 1919.
3 SHEETS—SHEET 3.
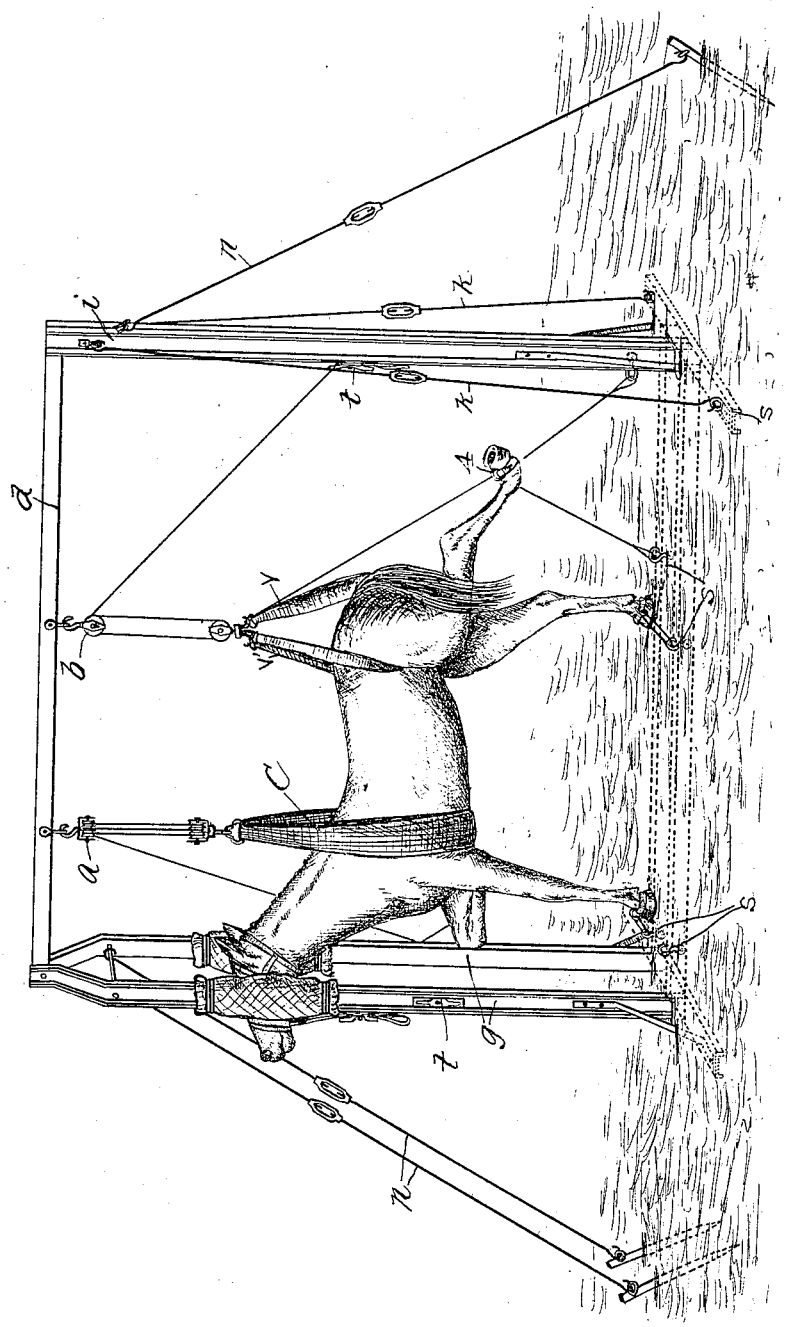

UNITED STATES PATENT OFFICE.

EUGÈNE GARNIER, OF LYON, FRANCE.

DEVICE FOR SECURING HORSES OR MULES WHILE BEING SHOD.

1,318,202.  Specification of Letters Patent.  Patented Oct. 7, 1919.

Application filed March 23, 1918. Serial No. 224,361.

*To all whom it may concern:*

Be it known that I, EUGÈNE GARNIER, a citizen of the French Republic, residing at Lyon, in France, have invented a certain new and useful Device for Securing Horses or Mules While Being Shod, of which the following is a specification.

This invention relates to a device for securing horses or mules while being shod.

The device comprises a framework provided with shackles and holding devices and by means of which the animal can be held immovable and its legs secured in the most suitable positions for shoeing, the framing is dismountable so that the device is readily transportable.

The annexed drawings illustrate an example of construction of the device.

Fig. 3 is a perspective view showing a horse secured in the device and in the position for shoeing.

Figure 1:
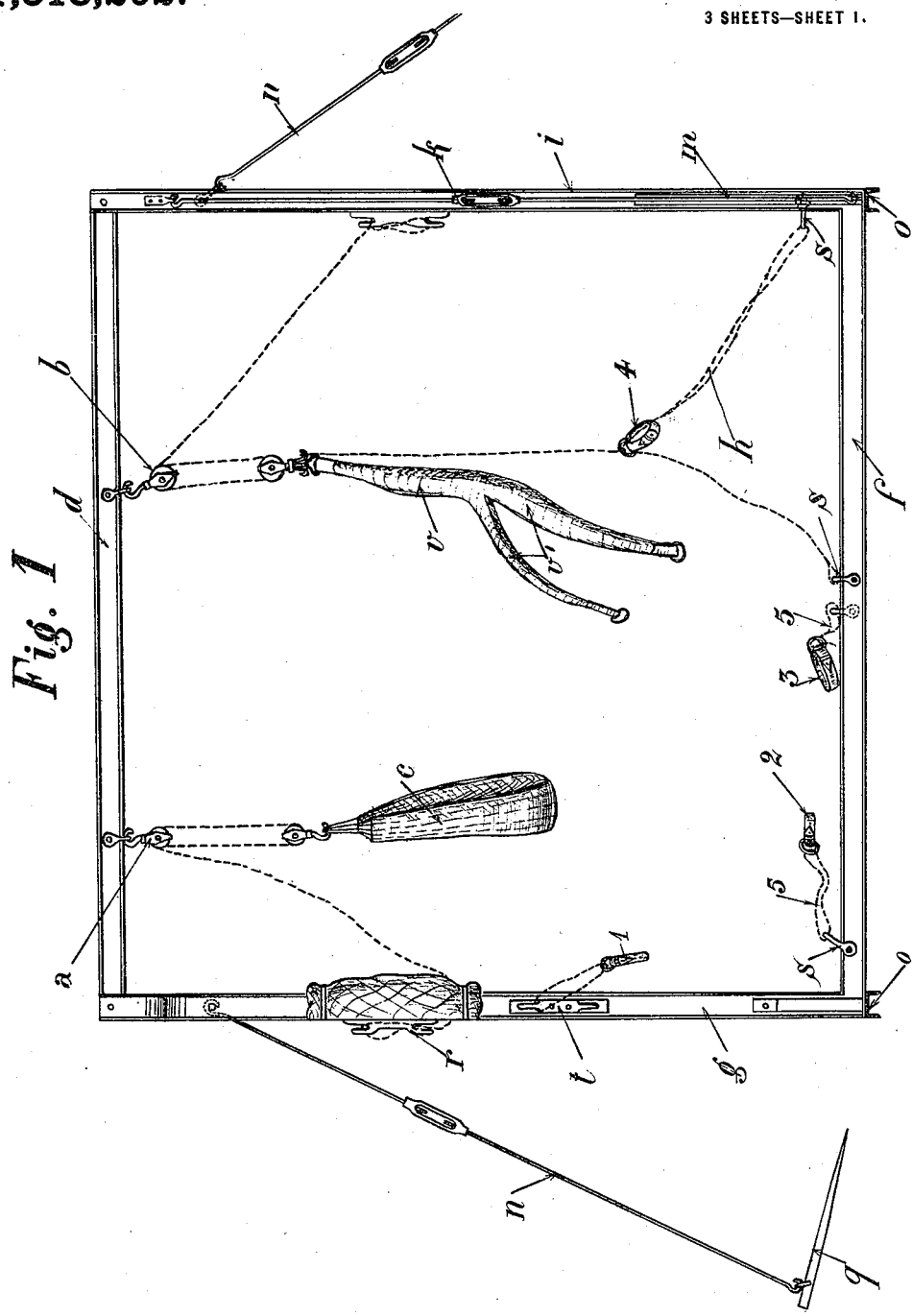
Figure 1 is a view in elevation of the frame mounted ready for use.
Figure 2:
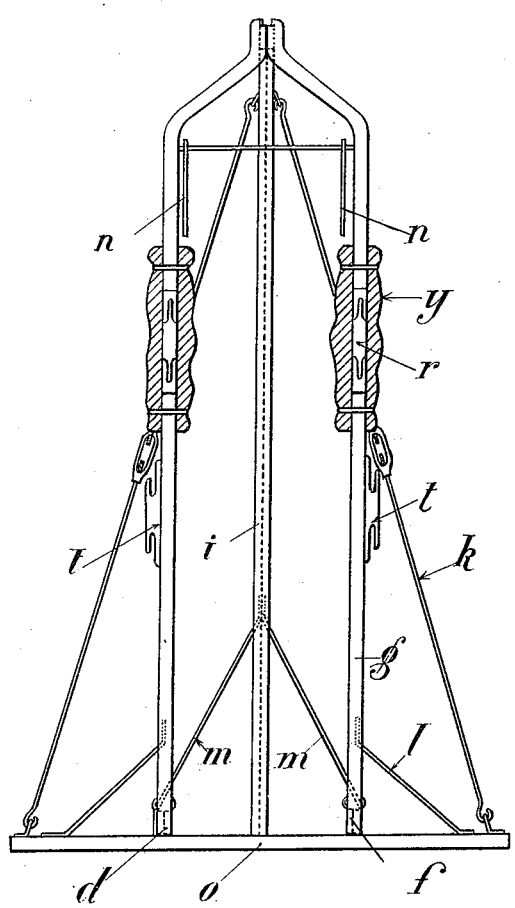
Fig. 2 is an end view of the frame.

The securing means comprises two tackle blocks $a$ and $b$ serving to support the animal and various shackles 1, 2, 3, and 4 provided with cords 5 attached to the iron fasteners $s$ of the framework and intended to maintain the legs of the horse or mule in position. The hooking irons $s$ of the different cords 5 connected to the shackles are fixed to definite points of a metal framework. The framework is composed of two frames $d$ $f$ made of angle iron of which the two front vertical bars $g$ $g$ and the single vertical rear bar $i$ are secured by shrouds $k$ and stays $l$ and $m$. Two other irons $o$ $o$ fixed to the lower parts of the frames increase the stability of the apparatus on the ground and serve for fixing the shrouds and the stays.

The different parts of the framing are connected by bolts which allow of quickly mounting the device at the place of use. The lower part is embedded in the ground to the level of the horizontal bars $d$ and $f$. Supplementary adjustable shrouds $n$ fixed to the upper part of the framing and to spikes $q$ driven into the ground assure rigidity to the whole.

The device is used in the following manner:—The animal is led into the framework, the head is placed between the front bars $g$ and is fastened by means of cords passing through the halter or bridle to hooks $r$ arranged on the said front bars $g$ in such a way that the animal's head is fixed in a raised position as shown in Fig. 3. The girth $c$ is then passed under the stomach of the animal at the position of the chest and is raised to the suitable height by means of the tackle $a$ the cord of which is then hooked to one of the irons $r$.

The shackles 1, 2, 3 and 4 are then attached to the legs the cords of these shackles being fixed to the hooks $s$ on the horizontal bars $d$ and $f$ and on the back upright $i$ at determined points of the same. The tackle $b$ allows of raising by means of the shackle 4 one of the rear limbs of the animal as shown in Fig. 3 so as to bring the hoof of the raised limb to the position for shoeing. A supplementary cord $h$ fixed to the bar opposite to the raised back limb prevents any lateral displacement.

A three ended strap $v$ $v^1$ is arranged for raising the rump of the horse. This strap is constituted by a strip of leather of uniform width from one end to the other, this strip is split longitudinally along the center from a certain point in order to divide it into two strips of equal width. The ends are turned over and stitched to form loops receiving metal buckles serving for attaching the strap to the suspension tackle.

The part $v$ of greatest width is shorter than each of the parts $v^1$ as the latter have to provide a greater length of envelopment as shown in Fig. 3. The strap is suitably padded.

The raising of the front limbs to the shoeing position is effected by hand and the definite position is assured by hooks $t$ fixed to the front bars $g$ to which the shackles 1 can be attached.

Two cushions $y$ are arranged on the bars $g$ at the position occupied by the head of the animal for the purpose of preventing wounds or bruises of the latter when it is being fixed.

The apparatus thus described allows the simultaneous shoeing of all or some of the hoofs of the animal which is held securely. The operations of shoeing are facilitated and can be effected without any danger from vicious or badly trained animals.

What I claim as my invention and desire to secure by Letters Patent of the United States is:—

A device of the character described comprising a dismountable framework having two vertical bars at the front end, a single vertical bar at the rear end and horizontal top and bottom bars, pads on said two front vertical bars, a pulley tackle secured to the horizontal top bar toward the front end thereof, a second pulley tackle secured to said top bar toward the rear end thereof, a girth secured to said first mentioned pulley tackle, a three limbed girth attached to said second mentioned pulley tackle, iron fastening devices secured to various points of said framework, cords connected to said fastening devices, shackles connected to said cords and means for fixing said framework rigidly to the ground.

In witness whereof I have signed this specification in the presence of two witnesses.

EUGÈNE GARNIER.

Witnesses:
GASTON JEANNIAUX,
GRADY CORBITT.

Copies of this patent may be obtained for five cents each, by addressing the "Commissioner of Patents, Washington, D. C."